COMBINED PHOTO-SENSITIVE ATTENUATOR AND CLIPPER

Filed March 14, 1967 2 Sheets-Sheet 1

INVENTOR.
WILLIAM ROSS AIKEN
BY
Kurt Kaucher

COMBINED PHOTO-SENSITIVE ATTENUATOR AND CLIPPER

Filed March 14, 1967 2 Sheets-Sheet 2

United States Patent Office 3,500,173
Patented Mar. 10, 1970

3,500,173

COMBINED PHOTO-SENSITIVE ATTENUATOR AND CLIPPER

William Ross Aiken, 10410 Magdalena Ave., Los Altos Hills, Calif. 94022
Filed Mar. 14, 1967, Ser. No. 622,948
Int. Cl. G05f 1/40
U.S. Cl. 323—21 3 Claims

ABSTRACT OF THE DISCLOSURE

A voltage limiter arrangement which consists of a signal responsive, adjustable attenuator and independent from the attenuator a voltage limiting diode clipper connected directly to the output line of the arrangement. The attenuator is preferably of the type employing a photo-sensitive resistance element, a source of radiations arranged to excite said resistance element and circuit means connected between the output line of the arrangement and the source of radiations for controlling the intensity of the source of radiations in response to an excessively strong input signal so as to limit the strength of the signal appearing in the output line of the arrangement to a pre-set voltage level. The clipper is arranged to clip the signal appearing in the output line of the attenuator at a slightly higher voltage level than the compression level to which the attenuator is set. Thus, in the event of a sudden and/or significant increase in the strength of a signal supplied to the input means of the attenuator, the signal supplied by the output line of the arrangement is rapidly compressed to said pre-determined level without noticeable distortions.

The present invention relates to circuit arrangements for confining the output volume of an applied signal to a pre-determined level irrespective of rapid and/or substantial changes in the volume of the applied signal.

The simplest arrangement for limiting the output volume of an applied signal to a predetermined level is the so-called clipper which employes biased diodes to shunt or block voltages above a predetermined level from the signal transmission line. The advantage of clippers is that their response to an applied signal of excessive strength is very rapid. However, they have the disadvantage that they mutilate and hence distort strong signals, and may do so to such an extent that the signals lose their identity.

Amongst other arrangements for controlling the output volume of an applied signal are the so-called attenuators. Some of these employ environment-sensitive resistors whose resistance value is made to vary with the strength of an applied signal such that the voltages developed across these resistors remain substantially stable and below a predetermined level irrespective of changes in the volume of the applied signal. While such attenuators are relatively free from distortion, they have the disadvantage that they respond with relative slowness to changes in the volume of an applied signal such that a rapid rise in the volume of an applied signal may cause a brief but annoying increase in the volume of the output signal.

It is an object of my invention to provide a voltage limiter arrangement that responds instantaneously to rapid changes in the volume of an applied signal, and yet is substantially free from distortion, so much in fact that any distortion in its output cannot be discerned by the human ear.

In accordance with the invention I combine a voltage limiting arrangement of the attenuator type with a voltage clipper in the order named, and I provide means for adjusting the performance of the attenuator type limiter and of the clipper in synchronism in such a manner that the volume level at which the clipper clips a received signal is always slightly higher than the volume level to which the attenuator compresses an applied signal. In this manner I obtain an adjustable volume control arrangement which combines the rapid response of a clipper with the freedom from distortion of an attenuator.

The above and other objects of the invention will be apparent from the following description of the accompanying drawings which illustrate a preferred embodiment thereof, and wherein FIGURE 1 is a circuit diagram of a voltage limiter arrangement embodying my invention;

Figure 1:
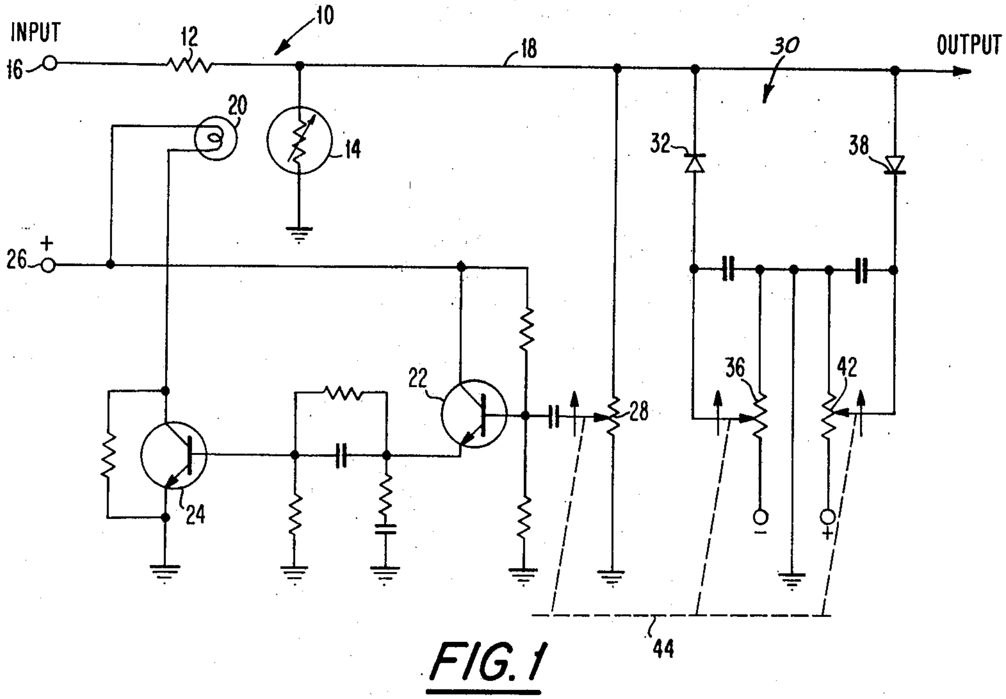

In FIGURE 1 the reference numeral 10 designates an attenuator which consists of a fixed resistor 12 and a photo-sensitive resistance element 14, for instance a solid state photo-cell, which are connected in series between the signal input means 16 and ground. The voltage developed across the photo-sensitive resistance element 14 appears as the intermediate output signal in line 18. When the signal applied to the input 16 remains constant, the voltage appearing in output line 18 depends upon the relative values of the resistors 12 and 14 and may be varied by changing the resistance value of the variable photo-sensitive resistance element 14. When the resistance value of said photo-sensitive resistance element is decreased, the volume of the output signal in line 18 decreases, and vice versa when the resistance value of the photo-sensitive resistance element is increased, the volume of the signal in output line 18 is increased. To vary the value of the photo-sensitive resistance element 14, it is exposed to illumination from an adjacently positioned lamp 20, and to maintain the volume of any signal appearing in output line 18 at or below a predetermined level, the degree of illumination of the lamp 20 is controlled by the volume of the signal passed through the attenuator 10. For this purpose a part of the signal appearing in output line 18 may be converted into a direct current signal in a rectifier or a heavily by-passed emitter follower, such as indicated at 22 in FIGURE 1, and is employed to control the conductivity of a current flow control element 24 in the power circuit of the lamp 20. The exact portion of the output signal that is to be converted into a control current and hence the degree of compression obtained with the arrangement is determined by the setting of a potentiometer 28. The converted signal is applied to the base of a transistor whose emitter and collector are connected into the power circuit of the lamp 20 and which constitutes the hereinbefore mentioned current flow control element 24 in said power circuit. By applying a direct current of increasing strength to the base of transistor 24, its emitter to collector conductivity is increased which in turn increases the flow of current in the power circuit of the lamp. Thus, by regulating the strength of the current applied to the base of transistor 24 in relation to the volume of the signal applied to the attenuator 10 the degree of illumination of the lamp 20 may be controlled in the required manner to maintain the signal voltage developed across the photo-sensitive resistance element 14 stable. Circuit arrangements of this type are described in detail in my U.S. Patent No. 3,325,724 issued on July 13, 1967 for a Voltage Stabilizer Employing a Photo-Sensitive Resistance Element and my U.S. Patent No. 3,331,012 issued July 11, 1967 for a Voltage Stabilizer Employing a Photo-Sensitive Resistance Element.

Figure 2A:
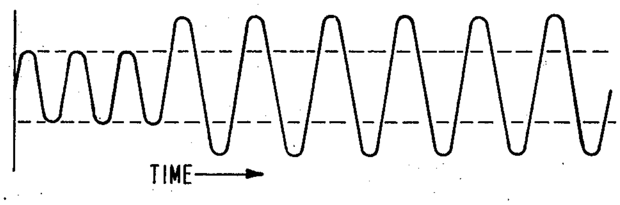
FIGURE 2A is a graph illustrating the volume of a signal applied to the circuit arrangement shown in FIGURE 1.
Figure 2B:
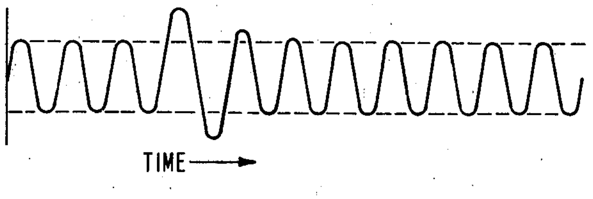
FIGURE 2B is a graph illustrating the output of the first part of the circuit arrangement shown in FIGURE 1, when the signal shown in FIGURE 2A is applied to it.

When a signal applied to the input means 16 of the attenuator 10 rises suddenly and significantly in volume, as illustrated in FIGURE 2A, the voltage developed across photo-resistor 14 and appearing in output line 18 also rises initially in volume as illustrated in FIGURE 2B. As explained hereinbefore, a part of the increased output voltage determined by the setting of potentiometer 28 is converted into a direct current signal by transistor 22, and is applied to the base of transistor 24. As the emitter to collector conductivity of transistor 24 is thus increased, the flow of current in the power circuit of lamp 20 increases and the lamp lights up, or increases in brightness depending upon its initial degree of energization. As a result thereof, the resistance value of the photo-sensitive resistor element 14 decreases and the voltage developed across said resistance element drops to a predetermined lower level as illustrated in FIGURE 2B. Said level may be adjusted by manipulation of potentiometer 28. It is raised whenever the contact arm of the potentiometer is moved closer to ground and it is lowered whenever the contact arm of the potentiometer is moved closer to the high potential end of the potentiometer because the described movements of the contact arm of the potentiometer increases or decrease the size of the control signal applied to the base of transistor 24.

The described occurrences require a small but noticeable amount of time, due mostly to the inertia of lamps and reasonably priced photo-sensitive resistors in responding to increased current flow and increased illumination, respectively. Hence, when the signal applied to the input means 16 of attenuator 10 rises rapidly, the signal in output line 18 may briefly yet noticeably rise above the desired maximum level, as illustrated in FIGURE 2B, thus producing an initial excessively loud response from the loudspeaker to which the output of the attenuator 10 may ultimately be delivered.

In accordance with the invention I connect to the output line 18 of attenuator 10 a clipper circuit, such as the diode type clipper circuit shown at 30 in FIGURE 1, and I bias its diodes in such a manner that the clipper circuit clips any signal exceeding a volume level slightly higher than the level to which the attenuator 10 is set to compress signals applied to input means 16. In FIGURE 1 the reference numeral 32 identifies a diode connected to the output line 18 in a position wherein it is capable of shunting negative going signals from said line. The opposite side of said diode is connected to a source of negative potential through a grounded potentiometer 36. The reference numeral 38 identifies another oppositely oriented diode connected between the output line 18 and a source of positive potential through a potentiometer 42. Thus the diode 32 passes all negative going signals beyond a volume level determined by the size of the source of negative potential and the setting of potentiometer 36, and the diode 38 passes all positive going signals beyond a volume level determined by the size of the source of positive potential and the setting of potentiometer 42. Whenever the contact arms of potentiometers 36 and 42 are raised, i.e. are moved away from the sources of negative and positive potential, respectively, and closer to ground, the bias applied to diodes 32 and 38 is decreased and the clipping level of the clipper circuit is correspondingly lowered; and vice versa, whenever the contact arms of the potentiometers 36 and 42 are shifted away from ground and closer to the sources of biasing potential, the bias applied to the diodes 32 and 38 is increased and the clipping level of the arrangement is proportionately raised. In accordance with the invention the contact arm of the potentiometer 28 in the attenuator arrangement 10, and the contact arms of the potentiometers 36 and 42 in the clipper circuit 38 are ganged for operation in synchronism to always provide a clipping level in the clipper circuit that is somewhat higher than the compression level of the attenuator circuit.

Figure 2C:
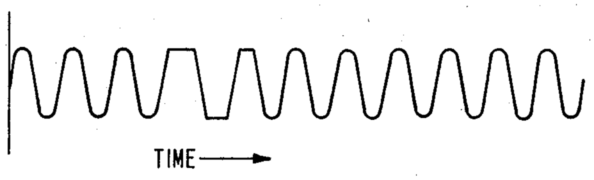
FIGURE 2C is a graph illustrating the output of the complete circuit arrangement shown in FIGURE 1 when the signal illustrated in FIGURE 2A is applied to it.

In the event of a slow response of the attenuator 10 to a rapid increase in the volume of an applied signal, the described arrangement makes it impossible for signals of excessive volume to appear at the output of the arrangement for even the briefest period of time, because any initial increase in the output volume of attenuator 10 is clipped at a level that is only slightly higher than the desired compression level of the attenuator (FIGURE 2C). On the other hand, any distortion of the output signal introduced by the operation of the clipper circuit during its brief effect upon the output of attenuator 10 is effectively removed from the range of human audio perception for the following reason: The effect of a clipper circuit upon a signal of excessive volume, i.e. a signal whose amplitude exceeds the limit set by the clipper circuit, is that the tops of the wave forms representing the output signals are flattened at the volume level set by the clipper (FIGURE 2C). This deformation of the signal is equivalent in effect to the generation of harmonics of the affected signal. Amongst these, the second and especially third harmonics are usually the strongest. Now, let it be assumed that the attack time of attenuator 10 is 111 microseconds which is an attack time that is feasible in the exemplary circuit arrangement illustrated in the accompanying drawings. This means that the lowest signal frequency subject to the full clipping action of the clipper circuit is about 9000 cycles. The lowest possible harmonics generated by clipping a signal of 9000 cycles, i.e. its second and third harmonics are signals of 18,000 cycles and 27,000 cycles, respectively. Few people can perceive a signal of a frequency of 18,000 cycles, and a signal of a frequency of 27,000 cycles is inaudible to the human ear. The higher harmonics of a signal of 9000 cycles are still further removed from the range of perceptiveness of the human ear. Thus, the distortion introduced into the output of attenuator 10 by the action of the clipper circuit upon signals of the longest wave length still fully subject to the action of the clipper circuit, are practically inaudible, especially in view of the fleeting nature of this particular distortion; and the distortions introduced by the action of the clipper upon signals of shorter wave lengths are effectively removed from the range of human perception. The composite volume limiter arrangement of my invention combines therefore the advantage of the extremely rapid response of the clipper circuit with the freedom from the distortion of the attenuator circuit, without the harmful slowness in the response of the latter and the distortion effected upon loud signals by the operation of the former.

Figure 3:
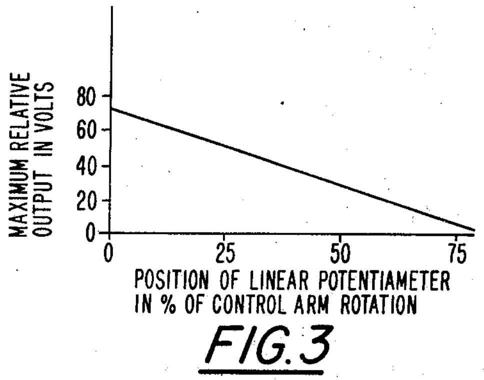
FIGURE 3 is a diagram illustrating the performance of an adjustable clipper circuit.
Figure 4:
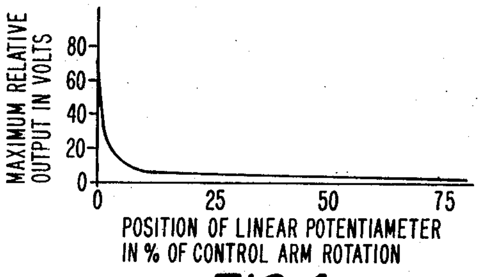
FIGURE 4 is a diagram illustrating the performance of an adjustable attenuator circuit.
Figure 5:
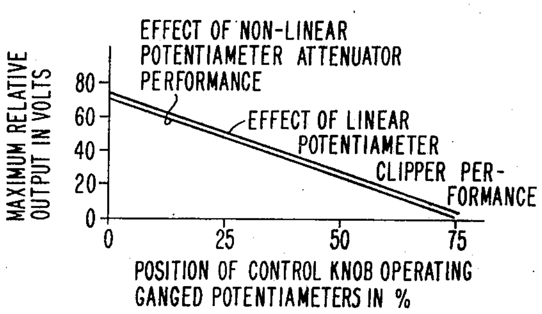
FIGURES 5 and 6 are diagrams illustrating the performance of adjustable attenuator and clipper circuits that are combined for cooperation in the spirit of my invention.

It may be desirable to provide means for adjusting the voltage limiting performance of the composite voltage limiter arrangement of my invention to different levels. As previously indicated, the degree of compression provided by the attenuator 10 may be controlled by manipulation of potentiometer 28, and the clipping level of the diode clipper 30 may be varied by manipulation of the potentiometers 36 and 42. When the potentiometers 36 and 42 are manipulated, the effect obtained upon the voltage clipping level provided by the clipper is substantially linear provided the potentiometers have a linear resistance strip, i.e. equal displacements of the contact arms of said potentiometers effect substantially equal changes in the clipping level. This is illustrated in FIGURE 3 wherein the maximum relative output of the clipper 30 is plotted against the displacement of the potentiometer control element from its fully effective position in percents. The relation between manipulation of potentiometer 28 and its effect upon the degree of compression provided by the attenuator 10 is not so simple and depends on many factors, such as the peculiarities of the photo-sensitive resistance element 14, the lamp 20 and the transistors 22 and 24. FIGURE 4 illustrates the relation between different degrees of compression provided by an exemplary embodiment of the attenuator 10 illustrated in FIGURE 1 and the changes in position of the contact arm of potentiometer 28 necessary to establish these different performances of the attenuator. FIGURE 4 shows that the setting of attenuator 10 to different equi-spaced compression levels has to be accomplished by displacements in the position of the control arm of potentiometer 28 which depart considerably from linearity. In accordance with the invention I gang the control elements of potentiometers 28 and 36, 42 for operation in unison, and I employ a non-linear potentiometer for either potentiometer 28, or for both the potentiometer 28 and the potentiometers 36, 42 so that upon manipulation of a common control means 44 for all of said potentiometers the volume limiting levels of attenuator 10 and clipper 30 shift in synchronism; i.e. are raised or lowered, as the case may be, while their initial difference is preserved, with the clipping level of the clipper circuit 30 at all times higher by a small predetermined difference than the compression level of the attenuator 10. FIGURE 5 illustrates a situation where this has been achieved by employing linear resistance strips for the potentiometers 36 and 42 of the clipper circuit 30 while using for the potentiometer 28 of attenuator 10 a non-linear resistance strip of such construction that equal displacements of the control element of the potentiometer from its fully effective position, withdraw progressively increasing increments of resistance from participation in the development of the control voltage supplied to the base of transistor 22. As a result thereof, the shifts in the voltage limiting levels of the clipper circuit and the attenuator circuit occur both in linear relation to the displacements of the common control element 44.

Figure 6:
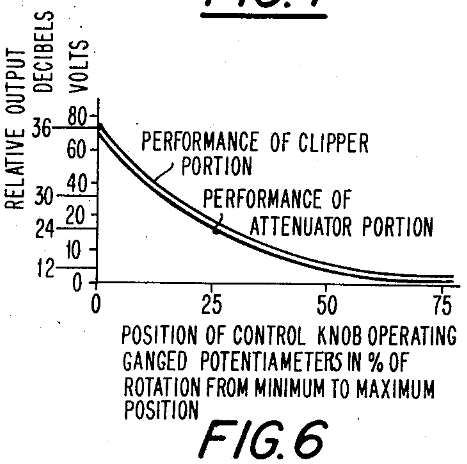

It is conventional preference, however, to provide audio controls that operate in linear relation to the volume of the sound that is actually produced rather than the magnitude of the output voltage, i.e. in linear relation decibels. For this reason it may be desirable to employ non-linear potentiometers for the control of both, the attenuator 10 and the clipper 30 so that the manipulation of the common control element 44 may affect the output levels of both circuits logarithmically. In such a situation the resistance strips of the potentiometers 36 and 42 of the clipper circuit 30 are of such non-linear construction that upon displacement of their control elements from fully effective position progressively decreasing increments of resistance are detracted from participation in the development of the biassing voltages supplied to the diodes 32 and 38. The performance of such an arrangement is illustrated in FIGURE 6 wherein the performance curves of both the attenuator and the clipper are non-linear with regard to the displacements of the common operating element 44. In this manner I am able to provide linear operation of the composite volume limiting arrangement of my invention in terms of decibels.

Figure 7:
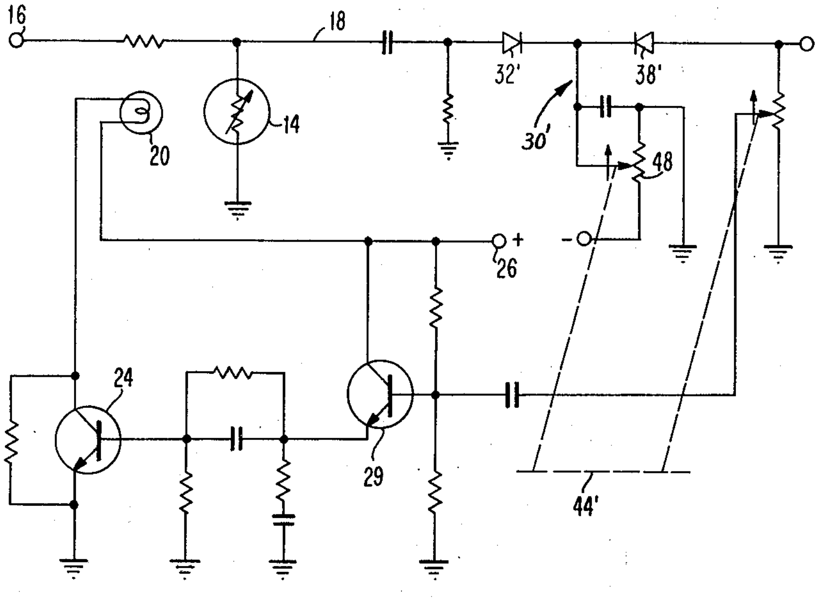
FIGURE 7 is a circuit diagram of a modified embodiment of my invention.

FIGURE 7 illustrates another composite volume limiting arrangement embodying the principles of my invention. It differs from the embodiment of the invention illustrated in FIGURE 1 in that the control voltage for the attenuator 10 is taken from the output line 48 of the clipper circuit 30' rather than the output line 18 of the attenuator itself, and that the clipper circuit 30' is of the type constituted by series-connected blocking diodes 32' and 38' that employ a common bias-control potentiometer 48, whereas the clipper circuit of the embodiment shown in FIGURE 1 was constituted by shunting diodes 32 and 38 which employed two separate bias-control potentiometers 36 and 42.

While I have explained my invention with aid of certain preferred embodiments thereof, it will be understood that the invention is not limited to the specific circuit components mentioned by way of example, which may be departed from without departing from the scope and spirit of the invention.

I claim:

1. A voltage limiting arrangement comprising a signal compressing attenuator having signal input means and an output line, a clipper independent of said attenuator connected to said output line, said clipper being arranged to directly clip the output signal of said attenuator at a slightly higher voltage level than the compression level to which said attenuator is set, and unitary means for varying the output signal voltage limiting levels of said attenuator and said clipper in synchronism while preserving the defined relation between said levels.

2. A voltage limiting arrangement according to claim 1 wherein said clipper has an output line and encompasses diodes and means including a potentiometer having an adjustable control element for selectively biassing said diodes and thus varying the clipping level of said independent clipper; and wherein said attenuator includes a photo-sensitive resistance element, a source of radiations arranged to excite said resistance element, circuit means including a potentiometer having an adjustable control element, said circuit means being connected between one of the named output lines and said source of radiations for controlling the intensity of said source of radiations in direct relation to the strength of the signal applied to said input means; and including means for varying the positions of adjustment of said potentiometer control elements in synchronism to vary the limiting levels of said attenuator and said clipper while preserving the defined relationship between said levels.

3. A voltage limiting arrangement according to claim 1 wherein said independent clipper has an output line and encompasses diodes and means including a non-linear potentiometer having an adjustable control element for selectively biassing said diodes and thus varying the clipping level of said clipper; and wherein said attenuator includes a photo-sensitive resistance element, a source of radiations arranged to excite said resistance element, circuit means including a non-linear potentiometer having an adjustable control element, said circuit means being connected between one of the named output lines and said source of radiations for controlling the intensity of said source of radiations in direct relation to the strength of the signal applied to said input means; and including means for varying positions of said potentiometer control elements in synchronism to vary the voltage-limiting levels of said attenuator and said clipper while preserving the defined relationship between said levels.

References Cited

UNITED STATES PATENTS

| | | | |
|---|---|---|---|
| 2,607,888 | 8/1952 | Bell | 323—9 X |
| 2,964,650 | 12/1960 | Radcliffe et al. | 307—317 |
| 2,974,269 | 3/1961 | Cooper | 323—16 X |
| 3,248,642 | 4/1966 | Rothschild | 323—21 |
| 3,422,356 | 1/1969 | Fritts | 333—14 X |

JAMES D. TRAMMELL, Primary Examiner

A. D. PELLINEN, Assistant Examiner

U.S. Cl. X.R.

250—205; 323—81